Feb. 8, 1944. F. W. McDONELL 2,341,409
WORK SUPPORTING DEVICE FOR PRINTERS AND THE LIKE
Filed Feb. 12, 1941 5 Sheets-Sheet 2

INVENTOR:
Frank W. McDonell
BY
his ATTORNEY

Feb. 8, 1944. F. W. McDONELL 2,341,409
WORK SUPPORTING DEVICE FOR PRINTERS AND THE LIKE
Filed Feb. 12, 1941 5 Sheets-Sheet 3

INVENTOR:
Frank W. McDonell
BY
his ATTORNEY

Feb. 8, 1944.   F. W. McDONELL   2,341,409
WORK SUPPORTING DEVICE FOR PRINTERS AND THE LIKE
Filed Feb. 12, 1941   5 Sheets-Sheet 4

INVENTOR:
Frank W. McDonell
BY
his ATTORNEY

Patented Feb. 8, 1944

2,341,409

UNITED STATES PATENT OFFICE 2,341,409

WORK SUPPORTING DEVICE FOR PRINTERS AND THE LIKE

Frank W. McDonell, Radburn, N. J., assignor to Newark Engineering Company, Hillside, N. J., a corporation of New Jersey Application February 12, 1941, Serial No. 378,514

17 Claims. (Cl. 101—38)

This invention relates to apparatus adapted for use in printing upon containers, such as bottles, jars, ampules, cans or the like, of circular cross-section. More particularly, it involves improvements in devices employed in such apparatus for supporting, guiding and conveying the articles to be printed upon and for presenting them properly to the printing means.

An object of the invention has been to provide devices of the character mentioned which may be readily and effectively adjusted to adapt them for the handling of articles of various sizes. Provisions are thus made for printing upon bottles, jars, ampules, or the like or a variety of other types of containers, which may vary substantially in diameter as well as length. The improved devices may be employed, moreover, for the handling and proper positioning of containers having slightly inclined or frusto-conical outer surfaces.

A further object of the invention has been to simplify the construction of apparatus of the character set forth and to facilitate its setting or adjustment and render its operation easy and efficient.

While the invention is particularly adapted for use in connection with printing devices, which require considerable accuracy in the positioning and adjustment of the articles to be printed upon in the course of rotation of the same, it is also applicable to machines of other types in which other operations may be performed upon the articles as they are presented at an appropriate working station.

Other objects and advantages of the invention will appear from a detailed description of an illustrative form of the same which will now be given in conjunction with the accompanying drawings, in which.

In its illustrative form the invention is particularly adapted for application to printing apparatus of the type disclosed in the application of John H. Fridén, Ser. No. 349,850, filed August 2, 1940. Thus, basically, the machine may comprise a chute 10 (Fig. 1) arranged to deliver the containers 11, to be printed upon, to a carrier, designated generally by the reference number 12, which serves to convey the containers through an arc of about 240°. The carrier 12 is mounted upon a shaft 13 by which it is driven, this shaft being operated either continuously or intermittently in any suitable manner, as in either of the ways disclosed in said pending application. Thus, referring to Fig. 15, if the operation is to be intermittent, a Geneva wheel 130 may be secured to the shaft 13. This wheel may be driven by an arm 131 secured to a shaft 132 which may be connected by gears 133 and 134 to a shaft 135 driven by means of a chain 136 from a motor or other source of power, not shown. At one point, preferably in about horizontal, radial alinement with the shaft 13, the container is presented to printing impression means, such as a transfer roller 14 carried by a shaft 15. The impression means may be of any suitable construction but, as explained in said pending application, it is preferably a roller provided with a soft, flexible blanket or outer layer of rubber or composition of similar character. The impression roller may be rotated continuously, as by suitable connections, such as gears 150 and 151, with the power-driven shaft 135. The shafts 13 and 15 are, in this way, driven in synchronism or in coordinated relation. At another point, preferably directly beneath the shaft 13, the carrier 12 is adapted to discharge the containers into any appropriate receptacle or receiver for further disposition. As disclosed in said pending application, an endless conveyor may be provided for this purpose, the conveyor having suitable means for receiving the printed containers without danger of marring the impressions thereon. Such a conveyor would, of course, be driven in synchronous or coordinated relation with the shafts 13 and 15.

Figure 3:
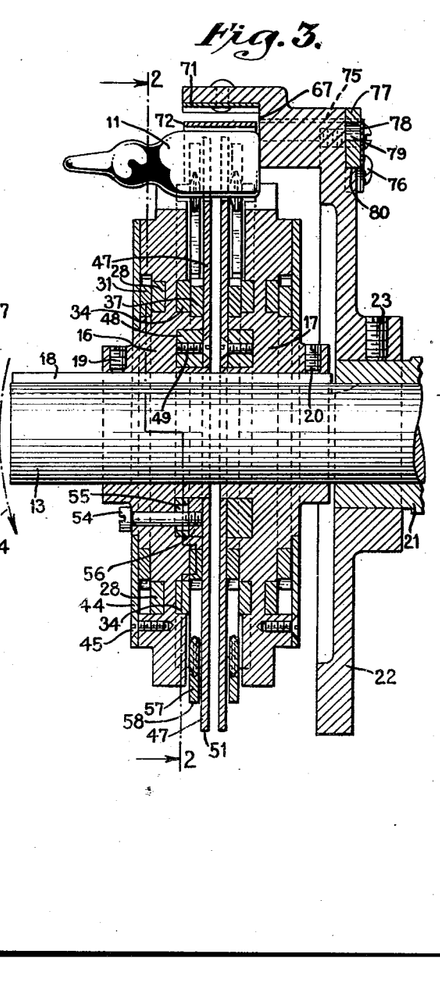
Fig. 3 is an axial sectional view through the carrier along the broken line 3—3 of Figs. 1 and 2.
Figure 4:
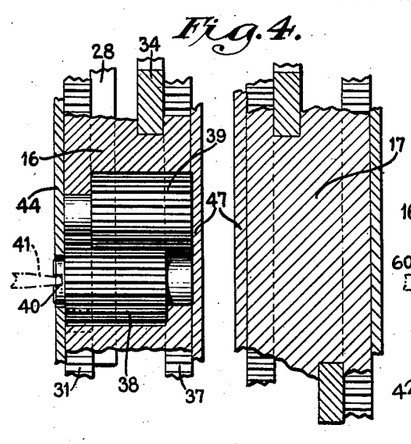
Fig. 4 is an enlarged detail in section of a portion of the carrier.

Turning now to the improved carrier, this is formed in two units or sections which are nearly identical, but differ slightly, and are arranged back to back. One unit has a main hub or base member 16 and the other a similar hub or base member 17 on which the various article receiving and retaining devices are adjustably mounted. These hub members are keyed to the shaft 13, by means of a long key 18 cooperating with suitable keyways, and are adjustable axially with relation to each other to such positions as may be best suited for the length of the containers to be dealt with. They may be secured in place by means of set-screws 19 and 20, respectively, adapted to cooperate with the outer face of the key 18. For relatively short containers, of the type illustrated in Fig. 3, the members 16 and 17 will be positioned quite close together. For longer containers they should be spaced apart a correspondingly greater distance. Shaft 13 is journaled in a hub or sleeve 21, which may suitably be a hollow boss forming part of an auxiliary frame mounted upon an appropriate supporting wall or frame, not shown, in the manner disclosed in said pending application. Secured to a slightly reduced portion of the boss 21 is a plate or disc 22 which will be described in greater detail hereinafter. This disc may be held in place by a set-screw 23.

Figure 7:
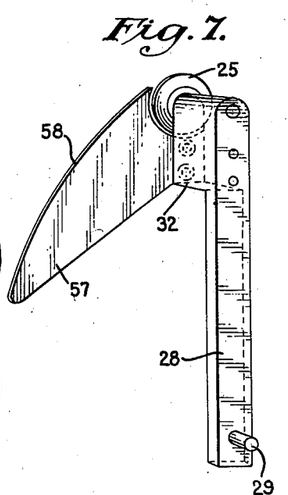
Fig. 7 is a perspective view of one of a number of article retaining rollers and supporting slide members provided on the carrier.

Inasmuch as the two units forming the carrier are substantially alike, only the one involving the base member 16 will be described in detail and certain features of difference between the two units will be subsequently pointed out. In the periphery of the member 16 there is formed a series of scallops or depressions 24 corresponding with the positions on the carrier at which the containers are to be retained. These scallops or depressions provide pockets into which portions of the containers may extend. At each of the depressions 24, of which six are shown in the drawings, there is provided a pair of discs or wheels or rollers 25 and 26 which are disposed in the same vertical plane and are adapted to engage the periphery of the article dealt with. Each disc or wheel 25 is carried by a stud 27 mounted in a slide bar 28 arranged to slide longitudinally in a groove in one face of the member 16. Adjacent its opposite end the bar 28 is provided with a small pin 29 which cooperates with an opening 30, slightly elongated in a radial direction, in a ring gear 31. It will be understood that a wheel 25 and slide bar 28 are provided at each of the depressions 24, and the series of bars 28 is connected in the manner indicated to the same ring gear so that all of these bars may be adjusted in unison. To place the wheels 25 in the appropriate plane, the outer ends of the slide bars 28 have off-set portions 32, as best shown in Fig. 7, adapted to slide in appropriate slots in the periphery of the member 16. The lower ends of these slots are indicated at 33 in Fig. 2.

Each wheel 26 is similarly mounted for rotation upon the outer end of a bar 34 slidable within a groove in the face of the member 16 opposite to that in which the bars 28 are held. Bar 34 carries a pin 35 at its inner end cooperating with a slightly elongated opening 36 in a ring gear 37. This arrangement likewise is such that a wheel 26 and bar 34 are provided for each depression 24 and the series of such bars is connected with a single ring gear 37 so that all of the bars may be shifted in unison.

The ring gears 31 and 37 are mounted upon annular shoulders formed on the member 16 and provision is made for adjusting the two ring gears in unison. For this purpose a broad-toothed pinion 38 meshes with the ring gear 31 and also with another broad-toothed pinion 39 which in turn meshes with the ring gear 37. Pinions 38 and 39 are carried by suitable studs and the stud which carries pinion 38 is provided with a groove 40 diametrically across its end so that it may be readily rotated by means of a screwdriver or similar tool 41. It will be seen that if the pinion 38 is rotated in a clockwise direction (Fig. 2), it will rotate the ring gear 31 in an anti-clockwise direction and will cause the series of slides 28 to shift outwardly. At the same time the pinion 39 will be rotated in an anti-clockwise direction and will turn the ring gear 37 in a clockwise direction so as to cause a corresponding outward movement of the series of slides 34.

The extent of movement of the slides 28 and 34 may be varied to suit the particular purposes of the construction. There is no occasion, of course, to shift them inwardly to a point at which the peripheries of the wheels 25 and 26 no longer project beyond the arcuate surfaces of the depressions 24. The limit of their outward movement should be such that the peripheries of the adjacent pairs of wheels will not become engaged. However, if the wheels are disposed in adjacent planes, rather than the same plane, they may assume overlapping positions. At all times the position of the wheels should be such that the outermost point on the periphery of the article carried by each pair of wheels will swing through an arc 43, Figs. 2 and 16, which is substantially tangent to the surface of the impression roller. Thus, the peripheries of the containers 11 on the carrier will at all times be internally tangent to a circle or an arc which is externally tangent to the impression roller.

Figure 12:
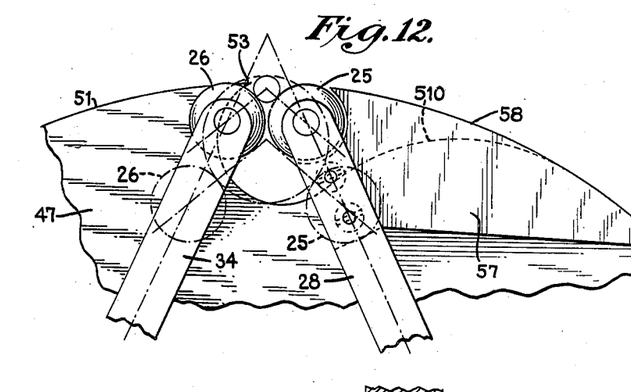
Fig. 12 is a fragmentary view in side elevation, showing article pick-up means and retaining wheels provided on the carrier, the wheels being shown in full lines in relation to an article of small diameter and in broken lines in relation to a larger article.
Figure 13:
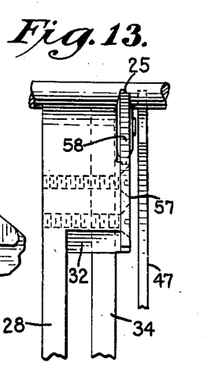
Fig. 13 is an edge view of the parts shown in Fig. 12.

It is desirable to have the lines of force acting between each pair of wheels 25 and 26 and the associated container 11 directed at substantially the same angle regardless of the diameter of the container and, hence, regardless of the position of adjustment of the wheels. Thus, referring to Fig. 16, the angle BAB is preferably substantially the same regardless of the diameter of the container 11. This is indicated in Fig. 12 by the parallelism of the lines connecting the axes of the wheels with the axes of the articles of different diameter. The angle BAB, which is $2\beta$, should, for the best support of the article or work, be approximately 90 to 120°. If it is less than 90°, the wheels will not provide effective support for the work and there is danger that the latter will ride out of the pocket formed by the wheels or will become jammed in some way against one of the wheels. On the other hand, if the angle is too great, there is danger of wedging the work between the pair of wheels and accordingly increasing the friction and thus reducing the efficiency of the device. To insure the maintenance of substantially the same angle regardless of the size of the work, the slide bars 28 and 34 should be so disposed in relation to each other that their axes will intersect at a point C (Fig. 16), which is beyond the arc 43 a distance equal to the radius of the wheels 25 and 26, that is CD should equal BF. This can, of course, be readily achieved by appropriately selecting the angle α or ECB, i. e., the angle between the line of movement of one of the slides and a radial line from the point of intersection of the lines of movement of the two slides. As may be shown by a trigonometric analysis of the diagram (Fig. 16), the desired condition results in having the angle α equal to one-half the angle β. It may be shown trigonometrically, moreover, that when the conditions specified are maintained, the angle β will remain constant regardless of the diameter of the work 11 so that the most efficient conditions of support are provided by the wheels regardless of the size of the article being handled.

On the outer face of the base member 16 there is provided an annular retaining member 44 which fits about a shoulder on the base member and is secured to the latter by means of a number of screws 45. The retainer is preferably formed of somewhat resilient material and is relatively thin so that it may yieldingly press against the outer face of the ring gear 31. The latter in turn presses against a portion of the face of each of the slide bars 28. The arrangement is preferably such that a slight clearance is provided, as indicated at 46, between the inner face of the retainer and a shoulder on the base member so that the retainer will be yieldingly held against the ring gear and will thus serve to retain this and the slide bars in place without interfering with proper adjustment of these elements.

At the opposite face of the base member a plate 47 is provided, this, as will be explained, serving as an article pick-up member. It has a large opening at its center surrounding a small hub extension of the base member 16. An annular hub member 48 is secured to the pick-up member 47 by means of a series of screws 49 and fits snugly within an annular groove in the side of the base member 16. As in the case of the retainer 44, a slight clearance 50 is preferably provided between the pick-up member 47 and the face of the base member 16 so that the ring gear 37 and the slide bars 34 will be yieldingly held in place by the pick-up member.

Figure 2:
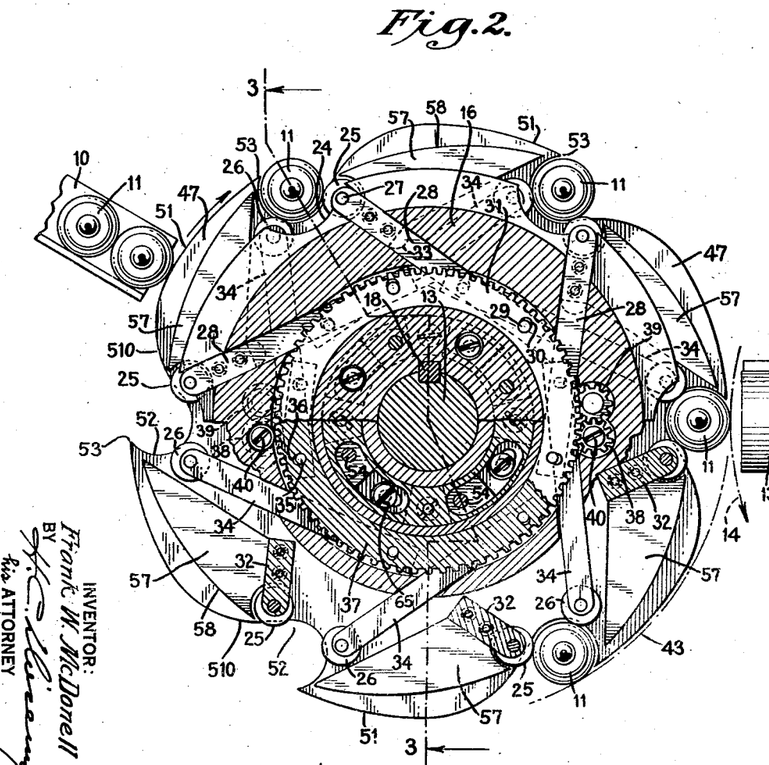
Fig. 2 is a transverse sectional view through the carrier along the line 2—2 of Fig. 3.

The periphery 51 of the pick-up member 47 is some distance radially beyond the periphery of the base member 16 and forms substantially a circle of slightly smaller radius than the previously mentioned arc 43. Thus, as best shown in Fig. 2, the periphery 51 of the pick-up member passes close to the lower end of the chute 10 and forms a surface against which the lowermost article is held until one of a series of pockets 52 in the periphery of the pick-up member is brought into line with the chute. At this time the lowermost container will drop into the pocket while the corner 53 at said pocket of the pick-up member will come between the selected container and the next container in line.

Now, as best shown in Fig. 12, it is desirable to shift the pick-up member slightly with reference to the base member 16 for articles of different diameter so that the corner 53 may always be located reasonably close to the periphery of the article as it is supported by the wheels 25 and 26. For smaller articles the corner 53 should be shifted relatively close to a radial line extending from the axis of the shaft 13 through the axis of the article. To permit this adjustment of the pick-up member, a series of bolts 54 is provided. These pass through arcuate openings 55 in the hub member 48 and have threaded engagement with sector-shaped nuts 56 provided in arcuate pockets formed between a part of the hub member 48 and the pick-up member 47. When it is desired to shift the pick-up member relative to the base member 16, the bolts 54 are loosened to release the friction between the parts. After the member has been correctly positioned, the bolts may be tightened again.

Figure 1:
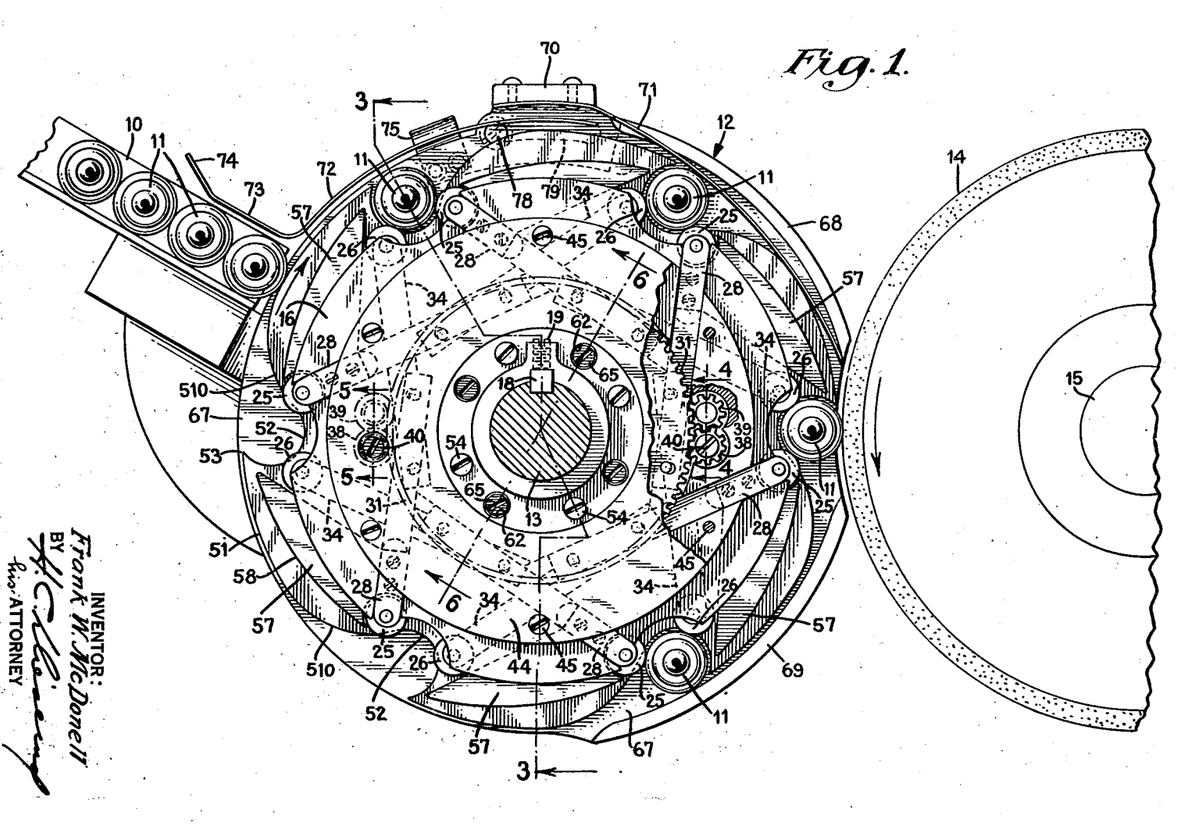
Fig. 1 is a side view of an improved article carrier and associated devices formed in accordance with the invention, portions of the carrier being broken away to disclose the interior construction more clearly.
Figure 8:
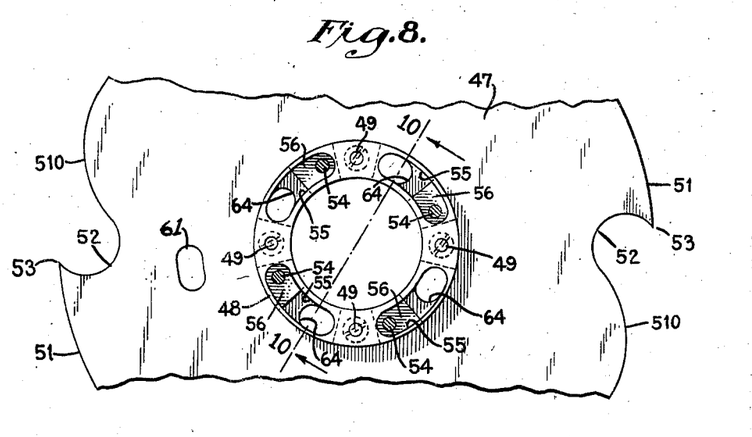
Fig. 8 is a side view of the central portion of an article pick-up member provided on one section of the carrier.
Figure 9:
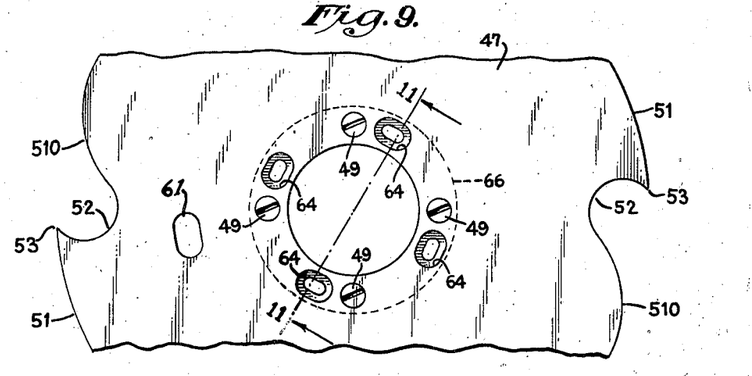
Fig. 9 is a similar view of another article pick-up member provided on another section of the carrier.
Figure 10:
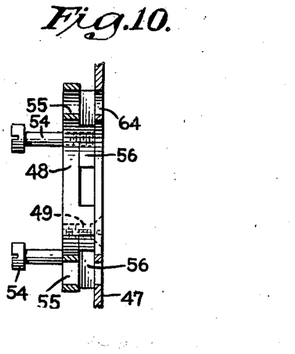
Fig. 10 is a sectional view taken along the line 10—10 of Fig. 8.
Figure 11:
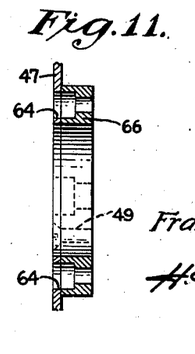
Fig. 11 is a similar sectional view along the line 11—11 of Fig. 9.

The pockets 52 in the pick-up member 47 are preferably formed as indicated in Figs. 1, 2 and 8. This configuration allows the successive work pieces to ride easily into the successive pockets as they are carried past the lower end of the chute. The action is particularly smooth when the articles are of substantially the maximum size intended to be handled. However, when work of smaller diameter is to be dealt with, so that the wheels 25 and 26 are adjusted outwardly to a substantial extent, the curvature of the trailing portion 510 of the surface 51 of the pick-up member is such as to cross or intersect the wheel 25 at an unfavorable angle so that the article will not ride smoothly into the pocket. To overcome this difficulty and insure the proper delivery of the articles into the successive pockets along paths substantially tangent to the wheels, each of the wheels 25 has associated therewith a guide member 57. The latter may be secured in any convenient way, as by means of the screws indicated, to the enlarged head portion 32 of the slide 28. This guide member, which is preferably in the plane of the wheel 25, i. e., closely adjacent to the pick-up member 47, is curved about the wheel and provided with an outer guiding surface 58 substantially tangent to the wheel and which extends to a point in close proximity to the periphery of the wheel. It will be seen that this arrangement is such that when the wheel 25 is shifted outwardly, into substantial overlapping relation with the pocket 52, the surface 58 will supplement the surface 51 of the pick-up member and will assist in correctly guiding a work piece into the pocket.

Figure 5:
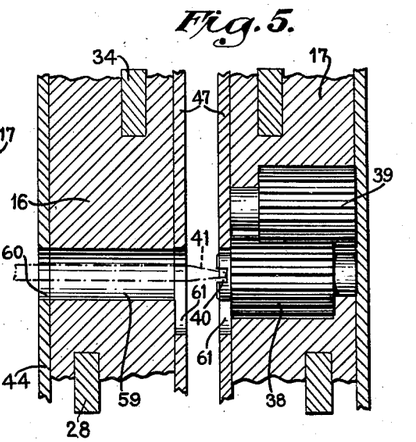
Fig. 5 is a similar enlarged view in section of another portion of the carrier.
Figure 6:
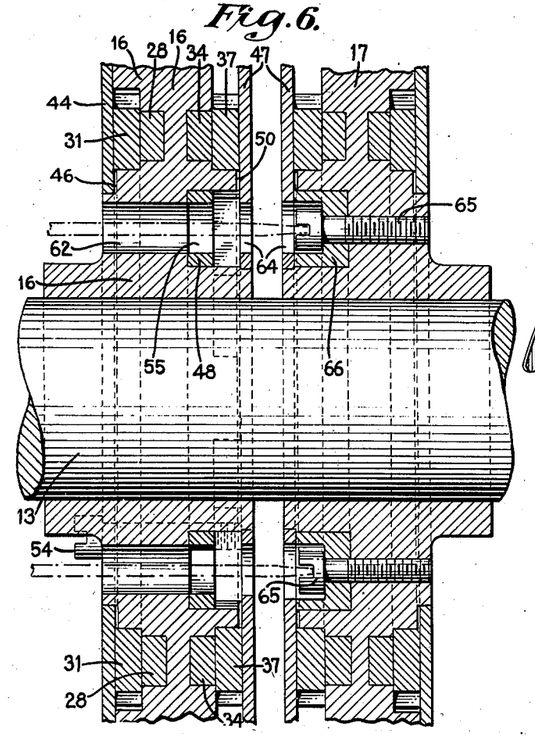
Fig. 6 is an enlarged axial section through the central portion of the carrier along the line 6—6 of Fig. 1.

As previously indicated, the two sections or units of the carrier are preferably substantially identical and are mounted back to back on the shaft 13. Some differences are, however, either necessary or desirable to enable or facilitate the adjustment of the various adjustable features of the device. For example, the left-hand section of the carrier (Fig. 5) has its supporting hub member 16 provided with an aperture 59 in axial alignment with the pinion 38 of the righthand section. So also the plate 44 of the left-hand unit is provided with an opening 60 in line with the aperture 59 while corresponding, elongated openings 61 of arcuate form are provided through the pick-up members 47 of both units. This arrangement is such that regardless of the adjustment of the pick-up members, a passage is provided through the left-hand section of the carrier and through the pick-up member of the righthand section to enable the insertion of a screwdriver or similar tool in the turning groove or slot of the supporting stud for the pinion 38. This enables the easy adjustment of the slides 28 and 34 of the righthand section of the carrier.

So also an aperture 62 is provided through the base member 16 in alignment with an elongated, arcuate opening 55 in the hub member 48 secured to the pick-up member of the left-hand section. Similar arcuate openings 64 are provided through both of the pick-up members 47 themselves, these openings insuring access to bolts 65 on the righthand section through the left-hand section of the carrier, regardless of the adjustment of the pick-up members. A screw-driver or similar tool may thus be readily employed to turn the bolts 65. The latter have threaded engagement with openings in the base member 17 and their heads are disposed in arcuate recesses in an annular hub member 66 secured by screws or the like to the pick-up member 47 of the righthand section of the carrier. Whenever an adjustment of this pick-up member is desired, the bolts 65 are simply turned to release the friction on the hub 66 and the bolts are tightened again after the proper adjustment has been made.

Suitable means are preferably provided for correctly positioning the work pieces on the carrier and for preventing their accidental displacement in the course of movement of the carrier. For this purpose the member 22 may be provided with a guide shoulder 67, extending from a point adjacent the chute 10 to a point adjacent the discharge position at the bottom of the carrier, against which the articles may be yieldingly urged by a spring finger or the like, such as that shown in the pending Fridén application above mentioned. A flange 68 may be provided also on the member 22 to extend over the work and assist in retaining the articles on the carrier as they are brought to the printing position. A similar flange 69 may be provided to assist in retaining the articles between the printing position and the discharge position at the bottom of the carrier. Other means, such as a guide member disposed substantially along the arc 43 and provided with a large opening to prevent contact with the printed surfaces of the articles, as shown in said pending application, may be employed in association with the flange 69 to retain the articles on the carrier until they reach the discharge point. At the top of the member 22 an extension 70 may be provided and to this may be secured a spring guide member 71 which extends along the flange 68 down to the lower end of the same. This spring guide serves more effectively to retain the articles on the carrier until they are brought into engagement with the impression roll 14. A similar spring guide member 72 may be provided to assist in properly guiding and retaining the articles during their initial movement with the carrier. An upturned extension 73 of the guide 72 may be disposed parallel with the chute 10 to assist in maintaining the articles in proper order as they are delivered to the carrier. This extension preferably has an outwardly inclined end 74 providing a converging passage with the bottom of the chute. Guide 72 is adjustably mounted on the member 22 so that the up-turned extension 73 and end 74 may function properly with relation to articles of different diameters. For this purpose a finger or extension 75, integral with the guide member, is secured by means of screws 76 to a slide 77. The latter is secured by means of a screw 78 to the outer surface of the member 22. Screw 78 cooperates with an elongated slot 79 in the slide and thus permits adjustment of the latter to any desired position within the limits of the construction. The lower edge of the slide 77 is arcuate and co-operates with an arcuate shoulder 80 on the member 22 concentric with the slot 79.

In the operation of the device, appropriate adjustments will first be made. The article supporting wheels 25 and 26 will be adjusted, by rotation of the pinions 38 and 39, to bring the periphery of a retained article into substantial tangency with the impression roller. The carrier sections will be adjusted axially along the shaft 13 for best advantage in relation to the length of the articles to be handled. So also, the pick-up members 47 will be adjusted to position their points 53 properly. Corresponding adjustment of the guides 57 will be automatically effected in the positioning of the wheels 25. A continuous series of bottles or other articles to be printed will be supplied to the chute 10 either by hand or automatically and will be picked up one at a time at the bottom of the chute by the pick-up plates. They are then carried to the printing station by the intermittent or continuous movement of the carrier. The operation of the printing devices, the proper adjustment of the parts to effect a clear impression, and the discharge of the printed articles may be carried out in the manner explained in said prior Fridén application. The clarity and uniformity of the printing impression may be regulated by proper adjustment of the article supporting wheels 25 and 26, either in lieu of or in conjunction with the adjustments of said prior application.

Figures 14, 15, 16:
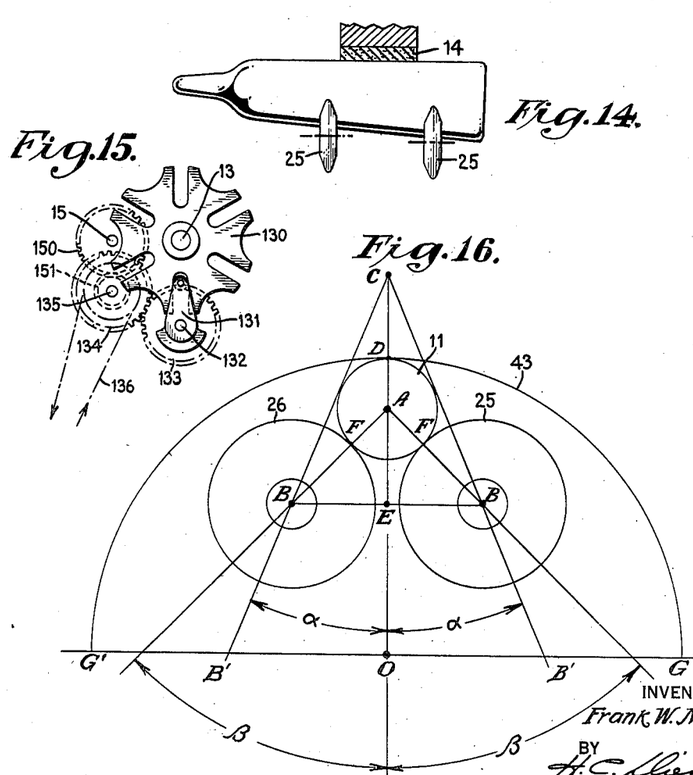
Fig. 14 is a schematic view illustrating the relation between the article retaining wheels and an impression member when the device is used for printing upon frusto-conical containers.
Fig. 15 is a detail view showing devices that may be employed for driving the carrier.
Fig. 16 is a diagram illustrating the preferred relationship between the article retaining members and the carrier for supporting articles of different diameter most effectively.

The article retaining wheels on the two sections of the carrier should be accurately adjusted to insure presentation of the surfaces of the articles in full-line or surface contact with the impression roller 14. The independent adjustment of the article supporting wheels on the two base members 16 and 17 makes this possible. Moreover, this independent adjustment provides a certain universality which enables advantageous use of the carrier under a variety of different circumstances. Thus, in printing on bottles or jars having necks of smaller diameter than the body, one set of wheels may engage the neck and the other the body without interfering with the proper support and presentation of the article to the impression roller. So also, in case the shafts 13 and 15 are forced out of parallelism due to high working pressures, proper independent adjustment of the article supporting wheels will, nevertheless, provide for equal working pressure over the entire length of the article. As illustrated in Fig. 14, furthermore, the construction is such that articles having a somewhat frusto-conical configuration may be correctly presented to the impression roller. The set of supporting wheels on one section of the carrier may be positioned at a somewhat greater distance from the axis of the shaft 13 than the wheels on the other section. If only a slight taper is involved, the adjustment should be such that the portion of the surface of the article that is presented to the impression roller will be parallel with the contacting surface of the latter which may still be cylindrical. There are, of course, limits to the slope of the face of the article to be printed in this manner, depending upon the nature of the design to be printed and other factors. In view of the frusto-conical form of the surface, points of greater radius will necessarily travel through a somewhat greater circumferential path than points of lesser radius while in contact with the impression roller. Accordingly, a slight, relative slippage will occur at most points. However, within limits, and particularly in the printing of coarser designs or lettering, the relative slippage will not be seriously objectionable. In printing upon articles having a greater taper an impression roller having a corresponding frusto-conical impression surface may be used and the article supporting wheels may be suitably adjusted to provide proper contact.

While an illustrative form of the invention has been disclosed in considerable detail, it will be understood that various changes may be made without departing from the general principles and scope of the invention. The terms and expressions used herein have been used as terms of description and not of limitation.

What I claim is:

1. In apparatus of the class described a rotatable carrier, means for delivering articles of circular cross-section to said carrier, means for rotating said carrier to convey said articles to a work station and then to a point of discharge, means associated with said carrier for frictionally engaging and revolving said articles thereon at said work station, a plurality of anti-friction means on said carrier for externally engaging and supporting said articles as they are revolved by said third-mentioned means, said anti-friction means being adjustable radially on said carrier to accommodate articles of different diameter, and means for adjusting said anti-friction means in unison said articles being automatically discharged from said carrier as they reach the point of discharge.

2. In apparatus of the class described, means for imparting a printing impression at an invariable point, a movable carrier for articles of circular cross-section to be printed upon, and adjustable means on said carrier adapted to receive and convey articles of different diameter and present the same at said invariable point, said adjustable means comprising shiftable wheels arranged to engage the periphery of said articles, and means for supporting said wheels on said carrier for movement along paths which intersect at a point beyond said invariable point a distance substantially equal to the wheel radius so as to cause the wheels to act on said articles at points spaced substantially the same angular distance apart regardless of the diameter of the articles.

3. In apparatus of the class described a rotatable carrier, means for delivering articles of circular cross-section to said carrier, means for rotating said carrier to convey said articles to a work station and then to a point of discharge, said articles being automatically discharged from said carrier as they reach said point of discharge, means associated with said carrier for frictionally engaging said articles at a substantially invariable point at said work station and rotating said articles on said carrier, a plurality of anti-friction means on said carrier for externally engaging and supporting said articles for revolution, and means for simultaneously adjusting the position of said anti-friction means on said carrier to properly present articles of different diameter at said invariable point.

4. A rotatable carrier for different sized articles of circular cross-section which comprises a substantially circular base member having article-receiving pockets in its periphery, wheels associated with said pockets for supporting said articles free of the walls of said pockets, and interconnected means shiftably mounted on said base member for supporting said wheels and simultaneously adjusting the position thereof relative to said pockets.

5. A rotatable carrier for different sized articles of circular cross-section which comprises a substantially circular base member having article-receiving pockets in its periphery, wheels associated with said pockets for supporting said articles free of the walls of said pockets, and means shiftably mounted on said base member for supporting said wheels and adjusting the position thereof relative to said pockets, said means being constructed and arranged to move the axes of the wheels associated with a pocket along paths which intersect at a point beyond the supported article a distance substantially equal to the wheel radius so as to provide cooperation between said wheels and each of said articles along at points spaced substantially the same angular distance apart regardless of the diameter of said articles.

6. A rotatable carrier for different sized articles of circular cross-section which comprises a shaft, a base member thereon, a plurality of slides shiftably mounted on said base member means for shifting said slides in unison on said member, and a wheel carried by each of said slides, said wheels being disposed substantially in a circle about the axis of said shaft, said slides being arranged in pairs, the slides of each pair being relatively shiftable at an acute angle to each other to carry the axes of the related wheels closer together or further apart as desired.

7. A rotatable carrier for different sized articles of circular cross-section which comprises a shaft, a base member thereon, a plurality of slides shiftably mounted on said base member means for shifting said slides in unison on said member, and a wheel carried by each of said slides, said wheels being disposed substantially in a circle about the axis of said shaft, said slides being arranged in pairs, the slides of each pair being relatively shiftable at an acute angle to each other to carry the axes of the related wheels closer together or further apart as desired, the construction being such that said wheels are arranged to engage the article in substantially the same angular relation regardless of the diameter of said article when the outermost point on the article is at a predetermined radial distance from the axis of said shaft.

8. A rotatable carrier for different sized articles of circular cross-section adapted to present the outermost points on the articles at the same radial distance from the axis of the carrier regardless of the size of the articles, which comprises a rotatable base member, a plurality of pairs of slides mounted on said member, the slides of each pair having their axes convergent at a point beyond the periphery of said member, means for simultaneously shifting all of said slides outwardly or inwardly, as desired, with respect to said member, and article-engaging anti-friction means on said slides adjacent their outer ends.

9. A rotatable carrier for different sized articles of circular cross-section adapted to present the outermost points on the articles at the same radial distance from the axis of the carrier regardless of the size of the articles, which comprises a rotatable base member, a plurality of pairs of slides mounted on said member, the slides of each pair having their axes convergent at a point beyond the periphery of said member, means for simultaneously shifting all of said slides outwardly or inwardly, as desired, with respect to said member, and article-engaging wheels on said slides adjacent their outer ends, said points of convergency of the axes of said slides being beyond said radial distance an amount substantially equal to the radius of said wheels.

10. In apparatus of the character described a chute adapted to deliver articles of variable circular cross-section, and a rotatable carrier adjacent said chute adapted to receive said articles therefrom by gravity, said carrier having article-positioning means at circumferentially spaced points adapted to engage the peripheries of said articles and convey the same with said carrier and having means intermediate said points presenting an arcuate surface arranged to engage the lowermost article on said chute to retain the same on said chute until the next positioning means is brought opposite said chute, said last-mentioned means being shiftable circumferentially with relation to said positioning means.

11. In apparatus of the character described a chute adapted to deliver articles of variable circular cross-section, and a rotatable carrier adjacent said chute adapted to receive said articles therefrom by gravity, said carrier having article-positioning means at circumferentially spaced points adapted to engage the peripheries of said articles and convey the same with said carrier and having means intermediate said points presenting an arcuate surface arranged to engage the lowermost article on said chute to retain the same on said chute until the next positioning means is brought opposite said chute, said last-mentioned means being shiftable circumferentially with relation to said positioning means, said positioning means being shiftable outwardly and inwardly to cooperate with articles of different diameters.

12. In apparatus of the character described a chute adapted to deliver articles of variable circular cross-section, a rotatable carrier adjacent said chute adapted to receive said articles therefrom by gravity, said carrier having article-positioning means at circumferentially spaced points adapted to engage the peripheries of said articles and convey the same with said carrier and having means intermediate said points presenting an arcuate surface arranged to engage the lowermost article on said chute to retain the same on said chute until the next positioning means is brought opposite said chute, guide means associated with said chute and carrier, said guide means having portions parallel with said chute and concentric with said arcuate surface respectively, and means for adjustably supporting at least a portion of said guide means to enable the latter to be shifted toward and from the articles and thus cooperate effectively with articles of different diameter.

13. In apparatus of the character described a chute adapted to deliver articles of variable circular cross-section, a carrier adjacent said chute rotatable relative thereto and adapted to receive said articles therefrom upon rotation relative thereto, article-positioning means adjustably mounted on said carrier at circumferentially spaced points and adapted to engage the peripheries of said articles and retain articles of different diameters during such relative rotation, article pick-up means associated with said carrier arranged to present a substantially continuous circumferential surface to the lowermost article on the chute, said surface being interrupted adjacent each of said positioning means, and means for varying the position of said interruptions in said surface with relation to said carrier.

14. In apparatus of the character described a chute adapted to deliver articles of variable circular cross-section, a carrier adjacent said chute adapted to receive said articles therefrom, article-positioning means adjustably mounted on said carrier at circumferentially spaced points and adapted to engage the peripheries of said articles and retain articles of different diameters, article pick-up means associated with said carrier arranged to present a substantially continuous circumferential surface to the lowermost article on the chute, said surface being interrupted adjacent each of said positioning means, means for varying the position of said interruptions in said surface with relation to said carrier, and means associated with said pick-up means for variably supplementing said circumferential surface adjacent said positioning means so as, in effect, to vary the extent of said interruptions.

15. In apparatus of the character described a chute adapted to deliver articles of variable circular cross-section, a carrier adjacent said chute rotatable relative thereto and adapted to receive said articles therefrom upon rotation relative thereto, article-positioning means adjustably mounted on said carrier at circumferentially spaced points and adapted to engage the peripheries of said articles and retain articles of different diameters during such relative rotation, said positioning means being adapted to present the outermost points on the articles at substantially the same radial distance from the axis of the carrier regardless of the size of the articles, article pick-up means associated with said carrier arranged to present a substantially continuous circumferential surface to the lowermost article on the chute, said surface having a radius slightly less than said radial distance and being interrupted adjacent each of said positioning means, and means for varying the position of said interruptions in said surface with relation to said carrier.

16. A rotatable carrier for different sized articles of circular cross section which comprises substantially circular supporting means, a plurality of wheels on said supporting means arranged in pairs, each pair being adapted to engage the outer surface of an article at spaced points, a plurality of means shiftable relative to each other and both radially and circumferentially with respect to said supporting means for supporting said wheels, and means accessible at a side face of said carrier for adjustment and arranged to adjust in unison the positions of said shiftable means.

17. A rotatable carrier for different sized articles of circular cross section which comprises substantially circular supporting means, a plurality of wheels arranged to engage the outer surface of an article at spaced points, means shiftable rectilinearly on said supporting means for supporting each of said wheels, and means accessible at a side face of said carrier for adjusting in unison the positions of all of said shiftable means to vary the positions of said wheels relative to each other and both radially and circumferentially with respect to said supporting means.

FRANK W. McDONELL.